Oct. 20, 1970    C. L. BOYD    3,534,602
MAGNETIC TURBINE FLOWMETER
Filed March 1, 1968    2 Sheets-Sheet 1
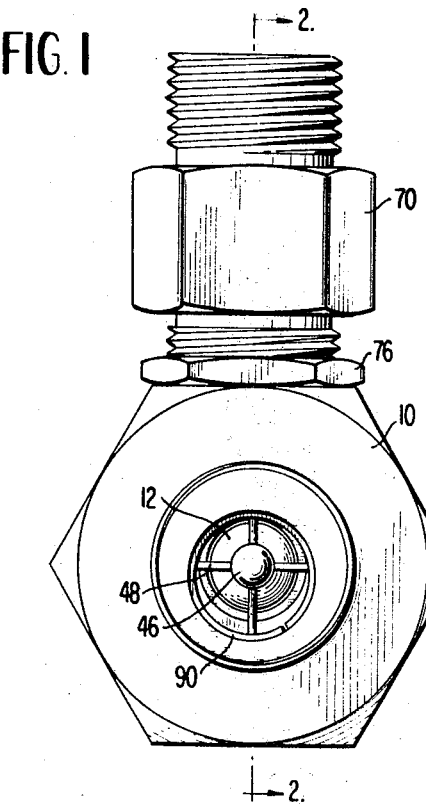
FIG. 1
FIG. 3
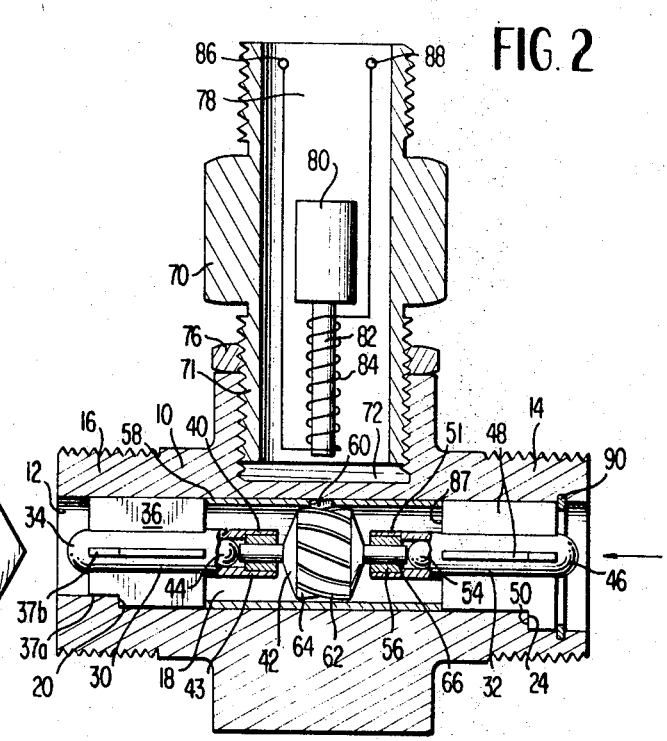
FIG. 2
FIG. 4
INVENTOR
CHARLES L. BOYD
BY Burns, Doane, Benedict, Swecker & Mathis
ATTORNEYS Oct. 20, 1970        C. L. BOYD        3,534,602
MAGNETIC TURBINE FLOWMETER
Filed March 1, 1968        2 Sheets-Sheet 2
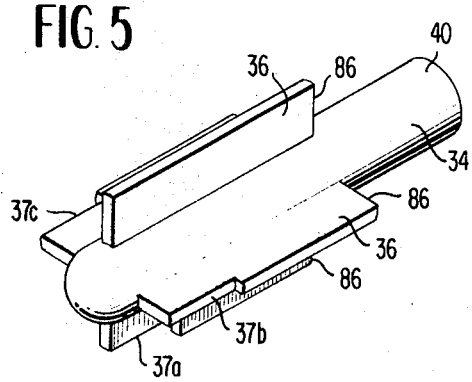
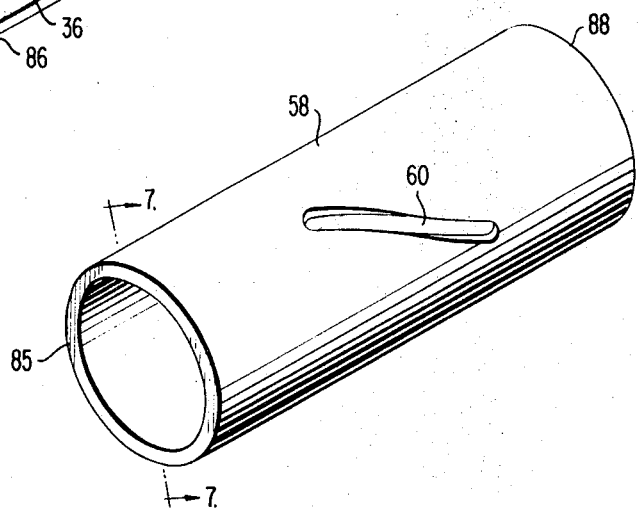
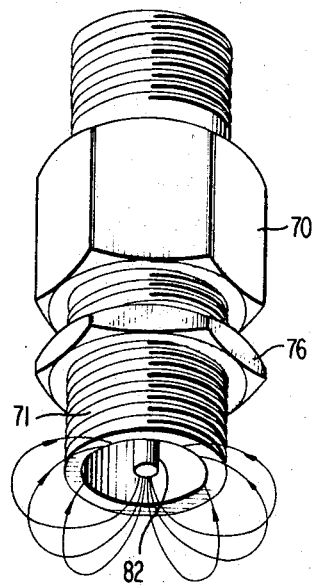
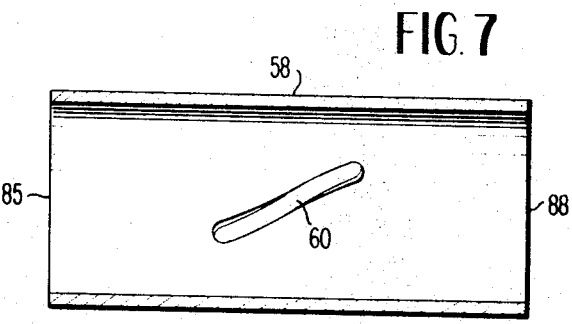
INVENTOR
CHARLES L. BOYD
BY Burns, Doane, Benedict, Swecker & Mathis
ATTORNEYS

United States Patent Office 3,534,602
Patented Oct. 20, 1970

3,534,602
MAGNETIC TURBINE FLOWMETER
Charles L. Boyd, Duncan, Okla., assignor to Halliburton Company, Duncan, Okla., a corporation of Delaware
Filed Mar. 1, 1968, Ser. No. 709,735
Int. Cl. G01f 1/10
U.S. Cl. 73—231    20 Claims

ABSTRACT OF THE DISCLOSURE

A magnetic flowmeter having a flow channel defined by three bores of successively larger diameters. The bores are disposed in contiguous relationship and have a common median plane and tangent. Thus, the center of each of the bores is offset slightly from the centers of the other bores. Each large bore, of each pair of adjacent bores, circumscribes the cross sectional area of the smaller diameter bore of each such pair so as to provide an upstream facing, crescent shaped shoulder at the downstream termination of the larger bore of the pair. Washout of the internal parts of the meter is prevented by abutment of the stationary, turbulence controlling vanes of the rotor supporting assemblies with the shoulders. Improper assembly of the meter and rotation of the vane assemblies is prevented by conforming the width of the vanes to the eccentricities of the flow channel. An apertured spacer sleeve of magnetic material surrounds the rotor to reduce the magnetic loading of the rotor and to thereby increase the linearity of flowmeter response.

BACKGROUND OF THE INVENTION

Fluid flowmeters having a fluid passageway in which a magnetic field is established and in which magnetic material is rotated by fluid flow through the magnetic field in proximity to a magnetic pickup are well known and find countless application in the fluid metering art. A representative flowmeter of the foregoing type is described in U.S. Pat. 3,164,020 to Groner et al.

Conventionally, the lines of magnetic flux from the permanent magnet in the pick-up unit pass through the nonmagnetic, fluid passage defining, flowmeter housing to establish a magnetic field through which the flowmeter rotor turns. This magnetic field is established in all planes throughout an arc of 360 degrees around the end of the pick-up unit. Rotation of magnetic material carried by the blades of the flowmeter rotor into and out of proximity of the pick-up unit modifies the strength on the magnetic field by changing the permeability of the magnetic flux path. The change in magnetic field strength induces a voltage in a stationary detection coil placed in the field externally of the fluid passageway.

As stated, the lines of magnetic flux extend in all planes throughout an arc of 360 degrees around the permanent magnet. The magnetic material carried by the flowmeter rotor is thus exposed to the lines of magnetic flux in positions other than and in addition to the position of immediate proximity to the magnet. The lines of magnetic flux may thus be continuously cut by the magnetic material on the blades of the rotating flowmeter rotor. The energy consumed by cutting these flux lines tends to load the turbine rotor and impair the response of the flowmeter.

At high flow rates the substantially constant magnetic loading of the flowmeter rotor may become negligible since the energy developed in the cutting of the lines of flux by the magnetic material is a function of flow rate. However, at low flow rates the magnetic loading of the rotor becomes a source of appreciable error.

The internal parts of fluid flowmeters of the type described are conventionally retained in the housing by snap rings placed in grooves in the internal walls thereof at opposite ends of the rotor supporting vane assemblies.

A problem encountered at times has involved the washout of the internal parts of the meter due to the sudden pressure applied by surges of fluid through the meter under the influence of high velocity pumps.

Vanes are customarily inserted in the flowmeter housing both upstream and downstream of the rotor. These vanes conventionally perform the dual function of supporting the rotor bearings and of ensuring the desired flow characteristics past the rotor.

A further problem in flowmeters of the type described is the undesired rotation of the turbulance-controlling stationary vane structure under the pressure applied by the high velocity fluid stream.

It is accordingly a primary object of the present invention to provide a novel method and apparatus for substantially reducing the magnetic loading of the rotor of a turbine flowmeter and to thereby increase the linearity of the flowmeter response.

Another object of the present invention is to provide a novel method and apparatus for limiting the lines of flux through which the rotor of a turbine flowmeter must turn by the utilization of an apertured shield of magnetic material interposed between the permanent magnet of the pick-up unit and the magnetic material carried by the flowmeter rotor.

Still another object of the present invention is to provide a novel flowmeter apparatus and method of assembly which prevents washout of the internal parts of the flowmeter in the direction of usual fluid flow therethrough.

A further object of the present invention is to provide a novel method and apparatus for preventing the rotation of the rotor supporting stator vane assemblies.

A still further object of the present invention is to provide a flowmeter in which the internal parts may be assembled externally of the housing for subsequent insertion therein.

Yet another object of the present invention is to combine the above enumerated objects in a flowmeter structure easily and quickly installed without fear of improper assembly.

These and other objects and advantages will be apparent from the claims when read in conjunction with the following detailed description and appended drawings.

GENERAL SUMMARY OF INVENTION

A principal of the invention resides in an apertured sleeve which is interposed between the rotor and magnetic pick-up of a magnetic flowmeter. This sleeve, which is fabricated of magnetic material, serves to confine the flux lines passing through the flow passage of the meter to a restricted zone so as to reduce the magnetic loading imposed on the rotor.

Another independently significant facet of the invention resides in the provision of mounting means for stator blade assemblies, which mounting means serve to simultaneously prevent downstream movement of the stator blade assemblies and rotational movement of these assemblies. These mounting means additionally ensure that the stator blade assemblies may be assembled only in a predetermined position within a flowmeter housing.

Another independently significant facet of the invention resides in a housing structure which requires flowmeter components to be assembled from the upstream end of a flow passage while preventing downstream movement of the components beyond predetermined positions.

Another independently significant facet of the invention resides in a unique interaction between stator blade assemblies and a magnetic shield which serves to unitize the resistance of these components against movement in either upstream or downstream directions.

A still further independently significant facet of the invention resides in a unique combination of eccentrically related, but axially spaced, abutments which serve to prevent the rotation of flowmeter components without requiring separate fastening means such as clips, snap rings, etc.

These facets of the invention, in both apparatus and method aspects, in combination, cooperate to yield optimum benefits of the invention.

THE DRAWINGS

FIG. 1 is an axial end view of a turbine type fluid flowmeter embodying the present invention;

FIG. is a section taken through lines 2—2 of FIG. 1;

FIG. 3 is a view from the upstream end of the flowmeter housing from which the internal parts of the flowmeter have been removed to show the eccentricity of the fluid passageway;

FIG. 4 is a section taken through lines 4—4 of FIG. 3;

FIG. 5 is a perspective view of the downstream vane assembly of the flowmeter of FIG. 2;

FIG. 6 is a pictorial view of the apertured sleeve of magnetic material which shields the flowmeter rotor from excessive lines of flux, with the sleeve turned from its FIG. 1 position clearly show the sleeve slot;

FIG. 7 is a section taken through line 7—7 of FIG. 6.

FIG. 8 is a perspective view of the magnetic pick-up unit of FIGS. 1 and 2 showing the pattern of magnetic flux established.

DETAILED DESCRIPTION

With continued reference to the drawings, FIGS. 1 and 2 illustrate a flowmeter having a housing 10 of nonmagnetic material. A fluid flow passageway 12 extends axially through the housing 10. The upstream end 14 and the downstream end 16 of the housing 10 may be externally threaded for convenient connection into a fluid line (not shown) through which the fluid flow is to be measured.

As is evident from FIGS. 3 and 4, the flow confining passageway 12 is formed to have three eccentric bores of progressively decreasing diameter in the direction of fluid flow. The smaller diameter bore 17 at the downstream end 16 of the housing 10 communicates with a longer bore 18. Bore 18 eccentrically enlarges the bore 17 to form a crescent-like shoulder 20 at their juncture intermediate the length of the housing 10. A second eccentric bore 22 has a still larger diameter and extends from the upstream end 14 of the housing 10 to communicate with the bore 18. A crescent-like shoulder 24 is formed at the juncture of bores 18 and 22. Bores 17, 18, and 22 have a common median plane and a common tangent at point T (see FIG. 3). An annular resilient snap ring receiving groove 26 is provided in the internal wall 28 of the bore 22 adjacent the extreme upstream end 29 of the housing 10.

Referring now to FIGS. 1 and 2, a pair of vane assemblies 30 and 32 are provided internally at opposite ends 14 and 16 of the fluid passageway 12. The downstream vane assembly 30 is shown more clearly in FIG. 5 and comprises a hub 34 and four radially outwardly extending vanes 36. The vanes 36 may be located at 90° intervals about the hub 34. Notches 37 are provided in the radially outer extremities of three of the vanes 36 to provide downstream facing shoulders 38. The radial width of the vanes 36 as notched is such that the hub 34 is centered in the axially intermediate bore 18 which extends through the major longitudinal portion of the housing 10.

The internal and upstream end 40 of the hub 34 is adapted to support the flowmeter rotor 42 in the bore 18 for rotation in response to fluid flow therethrough. A typical construction is illustrated in FIG. 2 in which the upstream end 40 of the hub 34 is bored to receive carbide bearing sleeve 43 and a low friction carbide thrust ball bearing 44.

The upstream vane assembly 32 is shown only in FIGS. 1 and 2. It also comprises a hub 46 and four radially outwardly extending vanes 48. The vanes 48 are notched at their downstream end to provide a downstream facing shoulder 50 in the manner of the vanes 36 of the upstream vane assembly 30 earlier described.

The notched portions of the vane assemblies cooperate with the unnotched portions to provide a structure for ensuring the proper assembly of the vane assemblies and for preventing downstream and rotary movement of the assemblies.

The unnotched portions of each vane assembly 30 and 32 are received within the main bore 22. These unnotched portions of the vanes of the assemblies 30 and 32 fit relatively snugly within the bore 22, as shown in FIG. 1.

As will be recognized, rotation of either vane assembly 30 or 32 within the passage 18 would produce an undesired misalignment of the vanes carried by each assembly, i.e., the vanes of the assembly 30 or the assembly 32, could be rotated about the assembly hubs. This undesired rotation of the vane assemblies is positively prevented by the notched vane portions.

As will be appreciated by reference to FIGS. 1 and 3, the crescent-like character of the shoulder 20 requires that the lower vane notch 37a have a depth greater than the notches 37b and 37c of the side vanes if the notched vane portions are to be disposed in the requisite snug-fitting relation with the wall of the bore 17. This snug-fitting relation of the notched portions of the vanes of assembly 30 within the bore 17 positively prevents rotation of the assembly 30 within the bore 18 because of the eccentric nature of the bores 17 and 18. Further, the difference in depth between the notch 37a and the notches 37b and 37c ensures that the assembly may be inserted consecutively into the bores 18 and 17 only in one position, i.e. the position where the notched vane portions may be circumferentially positioned in relation to the crescent-shaped shoulder 20 so as to enter the bore 17.

As will thus be appreciated, the notched blades of each stator assembly provide stepped abutment means disposed in slidable and contiguous engagement with stepped abutment means defined by portions of the bores 17 and 18 on either side of the crescent-shaped abutment 20. These abutment means interact to simultaneously prevent downstream movement of the stator assembly 30 and rotation of this stator assembly about the flow axis of the meter.

As will be apparent, similar criteria applies to the vane assembly 32 so as to ensure that this assembly 32 may be inserted in only one position within the bores 18 and 22 and to ensure that this assembly will not rotate within these bores when once inserted.

The internal or downstream end 51 of the hub 46 of the upstream vane assembly 32 may also be bored to receive a carbide thrust ball bearing 54 and a carbide bearing sleeve 56 to assist in supporting the rotor 42 in the bore 18.

A spacer sleeve 58 is illustrated in FIGS. 6 and 7 and is constructed of a magnetic material such as type AM 355 stainless steel. Sleeve 58 conforms in outside diameter to the diameter of the bore 18 and has sufficient rigidity to maintain the vane assemblies 30 and 32 in their axially spaced relationship.

An elongated aperture 60 is provided in the spacer sleeve 58. The shape of the aperture 60 conforms to the peripheral shape of the radial extremities 62 of the helically pitched rotor blades 64 subsequently to be described. The aperture 60 in the magnetic material of the sleeve 58 may be left open as a slot or may be filled with a suitable nonmagnetic material through which lines of magnetic flux may penetrate into the fluid passage 12.

A rotor shaft 66 is supported for rotation in the bearing sleeves 40 and 56 between the thrust bearings 44 and 54 of the hubs 34 and 46 of the respective vane assemblies 30 and 32. The rotor shaft 66 is thus supported coaxially with the bore 18. The earlier referenced rotor 42 is formed on or attached to the shaft 66 between the hubs 34 and 46 in a conventional manner. The rotor 42 has a plurality of the previously mentioned helically pitched blades 64 of magnetic material which may be, for example, type AM 355 stainless steel. The diameter of the blades 64 is such that their radial extremities 62 pass in immediate proximity to the internal walls 68 of the spacer sleeve 58 installed in the bore 18.

As seen more clearly in FIG. 2, the lower portion 71 of a magnetic pick-up unit 70 is threaded into a radially tapped blind opening 72 in the upper portion 74 of the nonmagnetic housing 10. The pick-up unit 70 is secured to the housing 10 in a conventional manner by an internally threaded locking ring 76.

A permanent magnet 80 is mounted in a conventional manner within the central cavity 78 of the pick-up unit 70. The magnet 80 typically has pole piece 82 of reduced diameter. Pole piece 82 extends downwardly toward the housing 10 and is provided with a detection coil 84. The ends of the coil are electrically connected to terminals 86 and 88. The pick-up unit 70 is entirely conventional in its construction and in its operation and may employ, by way of example, a standard Electro Products Model 3030 pick-up element.

The direction of the magnetic field established by the flux emanating from the permanent magnet 80 is illustrated in FIG. 6. The flux extends in all planes throughout an arc of 360 degrees around the lower end of the permanent magnet 82 immersing detecting coil 84 in the field established.

The sleeve 58 is rotationally positioned with respect to the housing 10 so that the aperture 60 is in immediate proximity to a pick-up unit 70. The aperture 60 is thus aligned between the radial extremites 62 of each of the rotor blades 64 and the pick-up unit 70 as the extremities 62 of the blades 64 rotate into proximity to the pick-up unit 70.

The unique construction of the flowmeter of the present invention permits insertion of all of the internal parts of the meter from the upstream end 14 of the housing 10. This enables the assembly of the rotor 42, sleeve 58, and the vane assemblies 30 and 32 externally of the housing 10 and the insertion thereof as a single unit into the fluid passageway 12. The downstream vane assembly 30 may thus be inserted through the upstream and larger diameter eccentric bore 22 into the bores 18 and 12. Axial movement of the downstream vane assembly 30 in the downstream direction is prevented by abutment of the shoulders 38 formed by the notches 37 of the vanes 36 with the shoulder 20 formed by the juncture of the eccentric bores 17 and 18.

Rotation of the downstream vane assembly 30 is prevented by the eccentricity of the bores 17 and 18 since the axial width of each of the vanes 36 conforms to the internal diameters of the bores 18 and 12 only in a single rotational position with respect to the housing 10.

Upstream movement of the downstream vane assembly 30 is prevented by the pressure of the downstream end 85 of the sleeve 58 against the upstream end 86 of each of the vanes 36.

Downstream movement of the upstream vane assembly 32 is prevented by the abutment of the downstream ends 87 of the vanes 48 against the upstream end 88 of the sleeve 58 and also by the abutment of the shoulders 50 of the vanes 48 with the shoulder 24 formed by the juncture of the eccentric bores 18 and 22.

Upstream movement of the upstream vane assembly 32 and thus of all of the internal parts of the flowmeter is prevented by the insertion of a resilient snap ring 90 into the groove 26 in the internal wall 28 of the largest diameter upstream eccentric bore.

The juncture of the eccentric bores 18 and 22 intermediate the axial length of the vanes 48 and the width of the vanes 48 which conform to the diameter of the bores 18 and 22 prevent rotation of the vane assembly 32 with respect to the downstream vane assembly 30.

In operation, the strength of the magnetic field in which coil 84 lies is established by the permanent magnet 80 of the pick-up unit 70. This field strength is significantly altered by the rotation of the rotor blades 64 of magnetic material into and out of the portion of the field established in the bore 18 through the aperture 60 in the sleeve 58. This change in the strength of the magnetic field induces a voltage in the coil 84 wound about pole piece 82. The output pulses which result are applied to terminals 86 and 88 where they may be amplified, shaped, scaled to the desired units, and counted by means of conventional electronic apparatus (not shown) to provide a manifestation of total fluid flow. The induced voltage pulses applied to the terminals 86 and 88 may also be converted in a conventional manner to a D.C. voltage level related to the frequency of the pulses to provide a manifestation of the rate of fluid flow. Magnetic drag on the rotor is thus reduced by limiting the area of the magnetic field in the bore 18 through which the magnetic material of the rotor 42 must turn.

The above described preferred embodiment of the present invention thus incorporates a unique structure which simultaneously prevents rotation of the vanes, improper assembly of the components, and washout of the internal parts of the meter in the normal downstream direction. The linearity of the flowmeter response is also increased by reducing the magnetic loading of the rotor. Linearities of ±0.50% over a flow range of 1 to 5 g.p.m. and ±0.75% over a flow range of 0.5 to 5 g.p.m. have been achieved in a meter having a linearity of 6.60% over a flow range of 1 to 5 g.p.m. with a sleeve of non-magnetic material.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to embraced therein.

What is claimed and desired to be secured by Letters Patent is:

1. A fluid flowmeter comprising:
   a housing having a fluid passageway;
   a rotor having a plurality of radially extending helically pitched blades, said rotor being mounted in said passageway for rotation in response to fluid flow through said passageway;
   magnetic material rotated in response to the rotation of said rotor;
   magnetic pick-up means mounted on said housing externally of said fluid passageway for detecting the rotation of said magnetic material; and
   magnetic shield means disposed between said pick-up means and said magnetic material, said shield having a nonmagnetic portion substantially aligned with said pick-up means and said magnetic material when said magnetic material is in detecting proximity to said pick-up means.

2. The flowmeter of claim 1 wherein said magnetic material is carried by said blades and wherein the nonmagnetic portion of said shield conforms substantially to the shape of the radial extremity of said blades.

3. The flowmeter of claim 1 wherein said shield comprises a sleeve of magnetic material disposed in said passageway around said rotor, said shield having an aperture that defines said nonmagnetic portion.

4. The flowmeter of claim 3 wherein said magnetic material is carried by said blades adjacent the radial extremity thereof and wherein said aperture conforms to the shape of said magnetic material.

5. A fluid flowmeter comprising:
   a housing, a first portion of said housing having a circular cross section fluid passageway of a first diameter, a second portion of said housing having a circular cross section fluid passageway of a second diameter, the passageway of said first and second portions being eccentrically related and in fluid communication;

a rotor;

rotor support means for coaxially supporting said rotor in the passageway of said second portion, said means including a hub and a plurality of vanes extending radially outward therefrom into an abutting relationship with the walls of the passageway of said first and second portions whereby rotation of said hub is prevented.

6. The flowmeter of claim 5;

wherein said housing includes a third portion having a circular cross section fluid passageway of a third diameter, the passageway of said third portion being eccentric to the passageway of said second portion and in fluid communication therewith; and wherein said rotor support means includes a second hub and a second plurality of vanes extending radially outward therefrom into an abutting relationship with the walls of the passageway of said second and third portions, whereby rotation of said second hub is prevented.

7. The flowmeter of claim 6 wherein said first plurality of vanes is separated from said second plurality of vanes by a sleeve disposed around said rotor in the passageway of said second portion.

8. The flowmeter of claim 7 wherein said sleeve is comprised of magnetic material and is magnetically apertured to permit the establishment of a magnetic field within the passageway of said second portion from a source of magnetic flux external of said housing.

9. A fluid flowmeter comprising:

a housing having a fluid passageway, said passageway having first and second discrete variations in diameter providing thereby first and second upstream facing shoulders;

a rotor mounted in said passageway for rotation in response to fluid flow therethrough;

means for supporting said rotor in said passageway;

first and second vane assemblies, each having a downstream facing shoulder adapted to abut one of said upstream facing shoulders;

a spacer sleeve disposed in said passageway between said vane assemblies and surrounding said rotor; and magnetic pick-up means mounted on said housing externally of said passageway for detecting the rotation of said rotor.

10. The flowmeter of claim 9 wherein said sleeve is comprised of magnetic material and has a nonmagnetic portion to allow the establishment of a magnetic field in said passageway by said pick-up means.

11. The flowmeter of claim 10 wherein the portions of said passageway having different diameters are eccentrically related to each other.

12. A fluid flowmeter comprising:

a housing having a fluid passageway including an upstream facing shoulder;

a first stationary vane assembly supported in passageway against downstream movement by abutment with said shoulder;

a sleeve supported in said passageway against downstream movement by said first vane assembly;

a second vane assembly supported in said passageway against downstream movement by said sleeve;

resiliently insertable means for preventing upstream movement of said second vane assembly;

a rotor supported for rotation in said passageway in response to fluid flow therethrough by at least one of said vane assemblies; and magnetic pick-up means for detecting the rotation of said rotor.

13. The flowmeter of claim 12 wherein said magnetic pick-up means includes a permanent magnet and wherein said sleeve is comprised of magnetic material apertured to permit the establishment of a magnetic field in said passageway by said magnet.

14. The flowmeter of claim 13 wherein said passageway has at least one eccentricity in cross section and wherein one of said vane assemblies includes a plurality of vanes conforming to said eccentricity to prevent rotation of said one vane assembly.

15. The method of reducing the magnetic drag of a turbine fluid flowmeter having a magnetic pick-up unit and magnetic means rotated in response to fluid flow comprising the step of disposing an apertured shield of magnetic material between the magnetic pick-up unit and the magnetic means.

16. The method of preventing rotation of the turbulence producing vanes of a fluid flowmeter having a circular cross section fluid passageway with a discrete change in diameter and longitudinal axis, and further having a vane assembly with a hub and a plurality of radially outwardly extending vanes, comprising the steps of:

(a) conforming the radial width of at least one of the vanes to the diameter of the fluid passageway on both sides of the discrete change; and (b) disposing the vane assembly in the fluid passageway at the discrete change in diameter and longitudinal axis.

17. A flowmeter apparatus comprising:

housing means;

wall means defining a flow passage in said housing means; and including upstream facing abutment means disposed eccentrically of the axis of the flow passage;

a blade bearing assembly disposed in said flow passage;

downstream facing second abutment means carried by said blade bearing assembly and disposed in contiguous and sliding engagement with said first abutment means, said first and second abutment means being operable to simultaneously prevent downstream movement of said blade bearing assembly and rotation of said blade bearing assembly about a longitudinal axis of said housing means.

18. A flowmeter comprising:

body means;

walls defining a flow passage extending through said body means;

a first stator blade assembly;

a second stator blade assembly; and a sleeve interposed between said first and second stator blade assemblies in force transmitting relationship to each of said assemblies;

said first and second stator blade assemblies and said sleeve being mounted within said passage and operable, at least in part, to move telescopingly within at least a portion of said passage as a unitary assembly.

19. A flowmeter comprising:

a housing;

wall means defining a flow passage extending through said housing;

a rotor assembly disposed within said passage;

longitudinally spaced and eccentrically related first and second abutment means interposed radially between said assembly and said housing and operable to permit slideable movement of said assembly within said passage at least in one longitudinal direction and prevent rotation of said assembly within said passage.

20. Means for preventing washout of any of the internal parts of a fluid flowmeter comprising:

a housing having a bore through which fluid flows, said bore having a larger diameter counterbore at the upstream end thereof to produce an upstream facing shoulder; and internal parts including a rotor and an upstream and downstream vane assembly, said internal parts having a downstream facing shoulder adapted to abut said upstream facing shoulder whereby downstream washout of any of said internal parts is prevented solely by the abutment of said shoulders.

References Cited

UNITED STATES PATENTS

| | | | |
|---|---|---|---|
| 3,089,336 | 5/1963 | Waugh et al. | 73—194 |
| 3,164,020 | 1/1965 | Groner et al. | 73—231 |
| 3,364,743 | 1/1968 | Clinton | 73—231 |

RICHARD C. QUEISSER, Primary Examiner

A. E. KORKOSZ, Assistant Examiner